United States Patent
Suresh et al.

(10) Patent No.: US 10,884,996 B1
(45) Date of Patent: Jan. 5, 2021

(54) SYSTEMS AND METHODS FOR OPTIMIZING AUTOMATIC SCHEMA-BASED METADATA GENERATION

(71) Applicant: NTT DATA Services, LLC, Plano, TX (US)

(72) Inventors: Suhasini Suresh, Plano, TX (US); Ramesh Kumar, Plano, TX (US); Dhurai Ganesan, Chennai (IN)

(73) Assignee: NTT DATA Services, LLC, Plano, TX (US)

( * ) Notice: Subject to any disclaimer, the term of this patent is extended or adjusted under 35 U.S.C. 154(b) by 342 days.

(21) Appl. No.: 15/907,028

(22) Filed: Feb. 27, 2018

(51) Int. Cl.
*G06F 16/38* (2019.01)
*G06F 16/907* (2019.01)
(Continued)

(52) U.S. Cl.
CPC .......... *G06F 16/211* (2019.01); *G06F 16/164* (2019.01); *G06F 16/38* (2019.01); *G06F 16/907* (2019.01)

(58) Field of Classification Search
CPC ............. G06F 16/24564; G06F 16/164; G06F 16/211; G06F 16/907; G06F 16/28; G06F 16/38
(Continued)

(56) References Cited

U.S. PATENT DOCUMENTS

| | | |
|---|---|---|
| 7,233,938 B2 | 6/2007 | Carus et al. |
| 7,624,027 B1 | 11/2009 | Stern et al. |

(Continued)

FOREIGN PATENT DOCUMENTS

WO WO-2016/064775 A1 4/2016

OTHER PUBLICATIONS

3M Health Information Systems, "3M Coding and Reimbursement System", 2017, 2 pages.
(Continued)

*Primary Examiner* — Robert W Beausoliel, Jr.
*Assistant Examiner* — Pedro J Santos
(74) *Attorney, Agent, or Firm* — Shackelford, Bowen, Mckinley & Norton, LLP

(57) ABSTRACT

A method of optimizing automatic schema-based metadata generation, the method including, receiving a trigger to automatically generate metadata for unstructured data, dynamically detecting a metadata optimization parameter for the unstructured data, automatically selecting a metadata schema for the unstructured data, identifying a pre-optimized metadata-generation format for the selected metadata schema, automatically transforming the unstructured data into an optimized metadata-generation structure of the pre-optimized metadata-generation format, identifying a metadata-generation logic set for the detected metadata optimization parameter, the identification based on a programmed association between the metadata-generation logic set and the detected metadata optimization parameter, and a stored pre-programmed logic set of computer-executable actions, executing the computer-executable actions in relation to the optimized metadata-generation structure, generating a search phrase responsive to the execution of the plurality of computer-executable actions, generating a metadata descriptor based on the search phrase and storing the metadata descriptor.

20 Claims, 12 Drawing Sheets

(51) Int. Cl.
*G06F 16/21* (2019.01)
*G06F 16/16* (2019.01)

(58) Field of Classification Search
USPC .......................................................... 707/803
See application file for complete search history.

(56) References Cited

U.S. PATENT DOCUMENTS

| | | | |
|---|---|---|---|
| 8,682,823 | B2 | 3/2014 | Heinze et al. |
| 2005/0203931 | A1* | 9/2005 | Pingree ................. G06F 16/951 |
| 2005/0273703 | A1* | 12/2005 | Doughan ................ G06F 16/23 |
| | | | 715/234 |
| 2009/0240726 | A1* | 9/2009 | Carter ................... G06F 16/211 |
| 2010/0094657 | A1 | 4/2010 | Stern et al. |
| 2010/0211564 | A1* | 8/2010 | Cohen ................... G06F 16/951 |
| | | | 707/722 |
| 2010/0306218 | A1 | 12/2010 | Bacon |
| 2013/0054259 | A1 | 2/2013 | Wojtusiak et al. |
| 2014/0082002 | A1* | 3/2014 | Kim ....................... G06F 16/434 |
| | | | 707/755 |
| 2014/0108047 | A1 | 4/2014 | Kinney et al. |
| 2015/0066537 | A1 | 3/2015 | Sheffer et al. |
| 2017/0061085 | A1 | 3/2017 | Nossal et al. |

OTHER PUBLICATIONS

3M Health Information Systems, "3M Coding and Reimbursement System Plus", 2015, 4 pages.
3M Health Information Systems, "3M Coding and Reimbursement System Plus (CRS+): Frequently asked questions", 2015, 3 pages.
White Plume Technologies, "AccelaCAPTURE™, a Charge Capture and Coding Solution", 2 pages.
White Plume Technologies, "AccelaPASS™, a Charge Capture and Coding Solution", 2 pages.
White Plume Technologies, "AccelaSMART™ Premium, a Powerful Workflow and Coding Resolution Engine", 2 pages.
Heinze, et al., "LifeCode a Deployed Application for Automated Medical Coding", Al Magazine, vol. 22, No. 2 (2001), 13 pages.
A-Life Medical, "A-Life Medical's Computer-assisted Coding Solution, Actus®, Streamlines the Coding Process", 2 pages.
Business Wire, Artificial Medical Intelligence Announces Industry's First Robotic Computer Automated Coding for Improved ROI at Hospitals, Sep. 27, 2012, 2 pages.
Foundation of Research and Education of American Health Information Management Association, "Automated Coding Software: Development and Use to Enhance Anti-Fraud Activities", Jul. 11, 2005, 65 pages.
EnableSoft, Inc., "Foxtrot Your Automated Employee", 4 pages.
Dolbey Systems, Inc., "Computer-Assisted Coding Solutions", 2017, 8 pages.
Covit, et al., "The practical Application of NLP technology for Computer Assisted Coding: A White Paper", Artificial Medical Intelligence, 2011, 12 pages.
Wojtusiak, J., et al., "Rule-based Prediction of Medical Claims' Payments, a Method and Initial Application to Medicaid Data," Tenth International Conference on Machine Learning and Applications, 2011, Honolulu, HI, 6 pages.
Broyles, T., et al., "An Early Warning System for Reducing ICD-10 Claim Denials," ICD10 Monitor, Oct. 5, 2015, URL: <https://www.icd10monitor.com/an-early-warning-system-for-reducing-icd-10-claim-denials>, Retrieved: May 24, 2018.

* cited by examiner

SYSTEMS AND METHODS FOR OPTIMIZING AUTOMATIC SCHEMA-BASED METADATA GENERATION

BACKGROUND

Technical Field

The present disclosure relates generally to metadata generation and more particularly, but not by way of limitation, to systems and methods for optimizing automatic schema-based metadata generation.

History of Related Art

Automated metadata generation of data, in its current state, is not widely utilized due, in large part, to the issues pertaining to error-prone metadata generation. These common error-prone metadata generations stems from a lack of optimized data structure, the lack of the ability to audit and/or verify metadata generation against known metadata results and the lack of automatic metadata generation customization.

SUMMARY OF THE INVENTION

A method of optimizing automatic schema-based metadata generation, the method including, receiving a trigger to automatically generate metadata for unstructured data, responsive to the trigger, dynamically detecting a metadata optimization parameter for the unstructured data based, at least in part, on a parsing of the unstructured data, automatically selecting a metadata schema for the unstructured data based, at least in part, on the metadata optimization parameter and the parsing of the unstructured data, identifying a pre-optimized metadata-generation format for the selected metadata schema based, at least in part, on a programmed association between the pre-optimized metadata-generation format and the selected metadata schema, automatically transforming the unstructured data into an optimized metadata-generation structure of the pre-optimized metadata-generation format, identifying a metadata-generation logic set, from among a plurality of stored pre-programmed metadata generation logic sets, for the detected metadata optimization parameter, the identification is based, at least in part, on a programmed association between the metadata-generation logic set and the detected metadata optimization parameter, and the stored pre-programmed logic set includes a plurality of computer-executable actions, executing the plurality of computer-executable actions in relation to the optimized metadata-generation structure, generating a search phrase responsive to the execution of the plurality of computer-executable actions, generating a metadata descriptor based, at least in part, on the search phrase and storing the metadata descriptor in relation to the unstructured data.

A system comprising a processor coupled to a memory, the processor is operable to implement a method that includes receiving a trigger to automatically generate metadata for unstructured data, responsive to the trigger, dynamically detecting a metadata optimization parameter for the unstructured data based, at least in part, on a parsing of the unstructured data, automatically selecting a metadata schema for the unstructured data based, at least in part, on the metadata optimization parameter and the parsing of the unstructured data, identifying a pre-optimized metadata-generation format for the selected metadata schema based, at least in part, on a programmed association between the pre-optimized metadata-generation format and the selected metadata schema, automatically transforming the unstructured data into an optimized metadata-generation structure of the pre-optimized metadata-generation format, identifying a metadata-generation logic set, from among a plurality of stored pre-programmed metadata generation logic sets, for the detected metadata optimization parameter, the identification is based, at least in part, on a programmed association between the metadata-generation logic set and the detected metadata optimization parameter, and the stored pre-programmed logic set includes a plurality of computer-executable actions, executing the plurality of computer-executable actions in relation to the optimized metadata-generation structure, generating a search phrase responsive to the execution of the plurality of computer-executable actions, generating a metadata descriptor based, at least in part, on the search phrase and storing the metadata descriptor in relation to the unstructured data.

A computer-program product comprising a non-transitory computer-usable medium having computer-readable program code embodied therein, the computer-readable program code adapted to be executed to implement a method that includes receiving a trigger to automatically generate metadata for unstructured data, responsive to the trigger, dynamically detecting a metadata optimization parameter for the unstructured data based, at least in part, on a parsing of the unstructured data, automatically selecting a metadata schema for the unstructured data based, at least in part, on the metadata optimization parameter and the parsing of the unstructured data, identifying a pre-optimized metadata-generation format for the selected metadata schema based, at least in part, on a programmed association between the pre-optimized metadata-generation format and the selected metadata schema, automatically transforming the unstructured data into an optimized metadata-generation structure of the pre-optimized metadata-generation format, identifying a metadata-generation logic set, from among a plurality of stored pre-programmed metadata generation logic sets, for the detected metadata optimization parameter, the identification is based, at least in part, on a programmed association between the metadata-generation logic set and the detected metadata optimization parameter, and the stored pre-programmed logic set includes a plurality of computer-executable actions, executing the plurality of computer-executable actions in relation to the optimized metadata-generation structure, generating a search phrase responsive to the execution of the plurality of computer-executable actions, generating a metadata descriptor based, at least in part, on the search phrase and storing the metadata descriptor in relation to the unstructured data.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
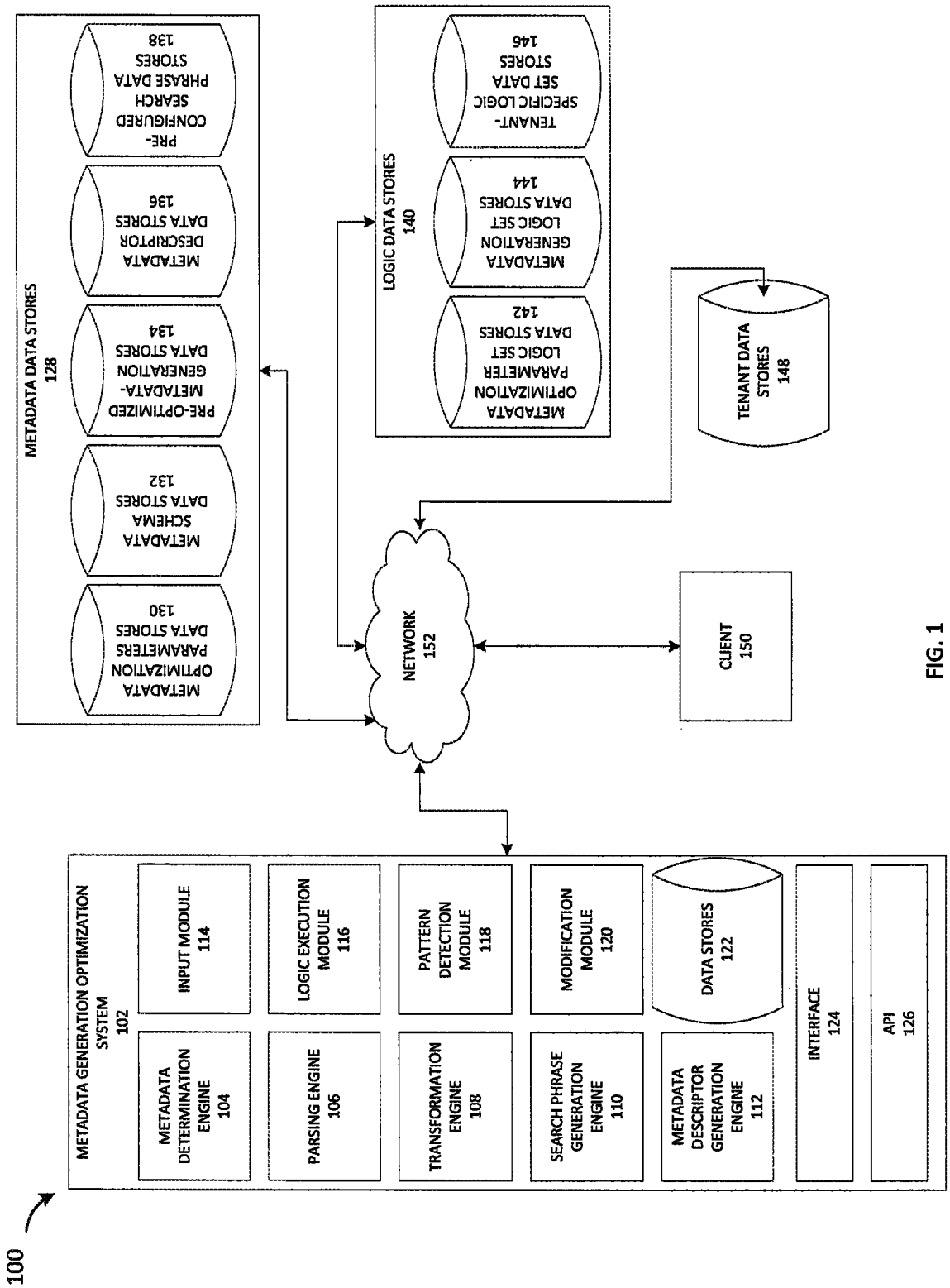
FIG. 1 illustrates an example system for optimizing automatic schema-based metadata generation.

Currently, there are a plethora of various unstructured data circulating through offices, homes, the Internet, intranets, public and private facilities, and the like. Examples of unstructured data can include menus, medical records, news articles, blog posts, research papers, exported webpages, electronic books, audio files, video files and the like. In a typical system, each set of unstructured data has to be analyzed manually to generate metadata for each set of unstructured data. Automatic metadata generators are typically slow, as there are copious amounts of data to parse and sequence, and most data is not structured in a format optimized for metadata generation. As data becomes increasingly more complicated, for example, hierarchical data structures and data structures with multiple data subsets, data has to be conditioned through multiple phases in order to proceed with automated metadata generation. Furthermore, manual and automatic metadata generation is highly error-prone as parsing unstructured data leads to gaps in many algorithms due to whitespaces, sentence fragmentation, images embedded in unstructured data, audio and/or video embedded in unstructured data and the like. These systems also lack the ability to automatically audit and/or verify metadata generation against known metadata results and then correct the automated metadata generation based on audits and/or verifications.

For purposes of this disclosure, unstructured data is intended to convey data that, from the perspective of a recipient, custodian or user of the data, in the context in which the data is being used, is not structured in a meaningful way. For example, the unstructured data can be text-heavy and may contain data such as dates, numbers and various other types of information that results in irregularities and ambiguities that make it difficult to decipher using traditional algorithms as compared to data stored in field-forms or databases, or are annotated or semantically tagged. Therefore, even if particular data has been previously organized in some way according to a data model or format, such data may still be considered "unstructured" to the extent that the organization is not relied upon by the recipient, custodian or user in a given use case.

Additionally, not only is manual and automatic metadata generation error-prone, but automatic metadata generation is especially susceptible because various algorithms and logic sets are required for each type of data, and typically data is required to be in a structured format prior to metadata generation for even relatively reliable results. Moreover, due to the nature of computer programs, automatic metadata generation has a major pitfall when any type of logic and/or algorithms to determine correct metadata needs to be changed. Generally, software updates of an entire system are required to rectify these issues and in the interim of waiting for developers to release updates, there is typically no way to modify the logic and/or pre-programmed algorithms performing the metadata generation.

In various embodiments, a user can send unstructured data to an optimizing automatic schema-based metadata generation system in order to receive specific metadata descriptors based on the unstructured data. In certain embodiments, the system can then take the unstructured data and parse the data to identify a metadata type of the unstructured data to facilitate in the generation of metadata. In certain embodiments, after the metadata type is identified, the system can execute a series of pre-programmed algorithms based on numerous logical sets to determine a metadata optimization parameter. In various embodiments, after running through a series of logical pre-programmed algorithms, the specific metadata optimization parameter can then be utilized to select an appropriate metadata schema corresponding to the unstructured data.

In certain embodiments, after the metadata schema is identified, the unstructured data can be transformed into an optimized metadata-generation structure to increase the speed, accuracy and overall performance of metadata generation. In some embodiments, after the unstructured data is transformed, metadata generation logic can be identified and the system can execute a series of pre-programmed algorithms based on numerous logical sets to determine search phrases that can then be used to query data stores to retrieve metadata information. In various embodiments, the metadata generation can be customized according to tenant-specific logic sets.

For example, a user can upload a restaurant menu that is in an unstructured format to automatically determine ingredients in particular food items that contain known allergens. The system could then parse the unstructured menu and identify a metadata type that corresponds to a menu. After the metadata type is identified, the system could then be able to identify a metadata optimization parameter that corresponds to food items. Following the identification of the metadata type and the metadata optimization parameter the system could then identify a metadata schema that corresponds to ingredients in each food item. After the system has identified the metadata type, the metadata optimization parameter and the metadata schema, the system is then able to transform the unstructured menu into a structure optimized for metadata generation. The system could remove various pictures of food items, pictures of beverages, restaurant information and the like, such that only the relevant data remains. The system could then generate a search phrase and query a data store for metadata information. In this example, the resulting output would include, for example, each food item on the menu with corresponding ingredients. A customized generation could include, for example, each food item on the menu with corresponding ingredients with particular highlights of known allergen ingredients, for example, nuts, soy, gluten and the like.

In various embodiments, the search phrases generated can be audited and/or verified against a known set of pre-configured search phrases to eliminate potential errors, increase the speed of metadata generation and/or customize the metadata generation. In further embodiments, a user can access the system to make changes to the pre-configured search phrases to update any errors that have been previously identified. In some embodiments, the system can receive modifications by a user to update, add, remove or otherwise modify the logic sets and/or pre-programmed algorithms to meet various customizations and demands for metadata generation.

FIG. 1 illustrates an example system 100 for optimizing automatic schema-based metadata generation. The system 100 includes a metadata generation optimization system 102, metadata data stores 128, logic data stores 140, tenant data stores 148 and a client 150 each communicatively coupled by a network 152. The network 152 can include, for example, any type of wired, wireless or cellular network that enables one or more computing systems associated with the system 100 to communicate. In some cases, the network 106 can include the Internet.

The metadata generation optimization system 102 includes a metadata determination engine 104, a parsing engine 106, a transformation engine 108, a search phrase generation engine 110, a metadata descriptor generation engine 112, an input module 114, a logic execution module 116, a pattern detection module 118, a modification module 120, data stores 122, an interface 124 and an application programming interface (API) 126. In various embodiments, the metadata determination engine 104, the parsing engine 106, the transformation engine 108, the search phrase generation engine 110, the metadata descriptor generation engine 112, the input module 114, the logic execution module 116, the pattern detection module 118, the modification module 120, the interface 124 and the API 126 can reside within the data stores 122. In other embodiments, the metadata determination engine 104, the parsing engine 106, the transformation engine 108, the search phrase generation engine 110, the metadata descriptor generation engine 112, the input module 114, the logic execution module 116, the pattern detection module 118, the modification module 120, the interface 124 and the API 126 can reside in multiple data stores spanning across the network 152. In other embodiments, the metadata determination engine 104, the parsing engine 106, the transformation engine 108, the search phrase generation engine 110 and the metadata descriptor generation engine 112 can reside in one data store, while the input module 114, the logic execution module 116, the pattern detection module 118, the modification module 120 and the interface 124 can reside in another data store. In certain embodiments, the system 100 is in a multi-tenancy architecture configuration in which single instances of each component within the system 100 can serves multiple recipients, custodians or users.

The metadata data stores 128 includes a metadata optimization parameters data stores 130, metadata schema data stores 132, pre-optimized metadata-generation data stores 134, metadata descriptor data stores 136 and pre-configured search phrase data stores 138, while the logic data stores 140 includes metadata optimization parameter logic set data stores 142, metadata generation logic set data stores 144 and tenant-specific logic set data stores 146.

In various embodiments, the metadata determination engine 104, the parsing engine 106, the transformation engine 108, the search phrase generation engine 110 and the metadata descriptor generation engine 112 can be contained in a single engine, while the input module 114, the logic execution module 116, the pattern detection module 118 and the modification module 120 can be contained in a single module. In some embodiments, each component within the metadata generation optimization system 102 can communicate and/or interact, over the network 152, with each component of the metadata data stores 128, the logic data stores 140, the tenant data stores 148 and the client 150 via the API 126.

In some embodiments, the metadata optimization parameters data stores 130, the metadata schema data stores 132, the pre-optimized metadata-generation data stores 134, the metadata descriptor data stores 136 and the pre-configured search phrase data stores 138, of the metadata data stores 128, can be in a single data store or span across several data stores over the network 152. In various embodiments, the metadata optimization parameter logic set data stores 142, the metadata generation logic set data stores 144 and the tenant-specific logic set data stores 146, of the logic data stores 140, can be in a single data store or span across several data stores over the network 152. In other embodiments, the tenant data stores 148 can be isolated from the system 100 and can reside within another network infrastructure maintained by a tenant.

In various embodiments, the input module 114 can be utilized to receive unstructured data, for example, medical records, contracts, restaurant menus, policy manuals, procedural manuals and the like, into the system 100 for metadata descriptor generation. In some embodiments, the metadata determination engine 104 can utilize the parsing engine 106 to determine a metadata optimization parameter and a metadata schema needed to generate metadata descriptors for particular unstructured data. For example, the input module 114 could receive an unstructured document, for example, a medical record, provided by a user via the client 150, the system 100 could then leverage the metadata determination engine 104, utilizing the parsing engine 106, to identify the type of metadata descriptors needing to be generated for the unstructured data, such as, metadata descriptors relating to particular medical coding. In some embodiments, the metadata determination engine 104 can leverage the logic execution module 116 to run various pre-programmed algorithms stored within the metadata optimization parameter logic set data stores 142 to identify a particular metadata optimization parameter to facilitate in the metadata descriptor generation. In various embodiments, after the metadata optimization parameters are determined, the metadata determination engine 104 can further identify, and select, specific metadata schemas from the metadata schema data stores 132 to be used in the metadata descriptor generation.

In some embodiments, the transformation engine 108 can take unstructured data and transform the unstructured data into an optimized format based upon the identified type of metadata descriptors to be generated. The transformation engine 108 can utilize the metadata optimization parameters determined by the logic execution module 116 and the selected metadata schema to identify pre-optimized metadata-generation formats from the pre-optimized metadata-generation data stores 134. In various embodiments, after pre-optimized metadata-generation formats have been identified, the transformation engine 108 can transform the unstructured data into optimized metadata-generation structures.

In certain embodiments, after the unstructured data has been transformed into an optimized metadata-generation structure, the search phrase generation engine 110 retrieves applicable metadata generation logic sets from the metadata generation logic set data stores 144. In various embodiments, the search phrase generation engine 110 can leverage the logic execution module 116 to run various pre-programmed algorithms stored within the metadata generation logic set data stores 144 to generate search phrases applicable to the optimized metadata-generation structure of the data.

In various embodiments, the metadata descriptor generation engine 112 can leverage the search phrases, as generated by the search phrase generation engine 110, to query the metadata descriptor data stores 136 in order to obtain a metadata descriptor for the data. In certain embodiments, the metadata descriptor data stores 136 can contain sub-data stores pertaining to different metadata descriptors. In further embodiments, the metadata descriptor data stores 136 can include hierarchical data stores. In some embodiments, the query to the metadata descriptor data stores 136 can generate a multitude of metadata descriptors. In some embodiments, multiple metadata descriptors are identified and the metadata descriptor generation engine 112 can identify maximum token values for each result returned, rank the token values for each result returned to isolate the highest token match of the returned results to generate a metadata descriptor for the data. In some embodiments, tokenization rulesets are stored in the data stores 122 and can include rulesets relating to priority, relevance, context and the like.

In various embodiments, the metadata descriptor generation engine 112 can leverage the search phrase, as generated by the search phrase generation engine 110, to query the pre-configured search phrase data stores 138 to validate and/or audit a generated search phrase to ensure correct generation of the metadata descriptor by the metadata descriptor generation engine 112. In various embodiments, the metadata descriptor generation engine 112 can invoke the pattern detection module 118 to verify that the pre-configured search phrase has a pattern equivalent to, or that sufficiently matches, the generated search phrase pattern. In certain embodiments, the pattern detection module 118 verifies that the pre-configured search phrase was derived with the same metadata optimization parameter logic set as the search phrase generated by the search phrase generation engine 110. In certain embodiments, if the patterns match, the metadata descriptor of the pre-configured search phrase is utilized rather than performing a search for the metadata descriptor in the metadata descriptor data stores 136. In various embodiments, the pre-configured search phrases can be utilized to bypass searching the metadata descriptor data stores 136, avoid errors that may occur when searching based on the generated search phrase and/or to perform audits of generated metadata descriptor results. In some embodiments, a user can modify the pre-configured search phrases stored in the pre-configured search phrase data stores 138 via the interface 124. In other embodiments, modification to the pre-configured search phrases stored in the pre-configured search phrase data stores 138 can be batch updated, modified and the like, via the API 126. In certain embodiments, when the pattern detection module 118 determines that the pattern of the pre-configured search phrase and the generated search phrase do not match, the pattern detection module 118 can invoke the metadata descriptor generation engine 112 to perform a search in the metadata descriptor data stores 136 to generate a metadata descriptor.

In certain embodiments, the metadata descriptor generation engine 112 can identify that a particular tenant of the system 100 requires various forms of logic to be applied to the generated metadata descriptor. In various embodiments, the metadata descriptor generation engine 112 can leverage the logic execution module 116 to run various pre-programmed algorithms stored within the tenant-specific logic set data stores 146 to modify the metadata descriptor generated by the metadata descriptor generation engine 112.

In certain embodiments, a user accessing the modification module 120 via the interface 124 can edit logic algorithms in the metadata generation logic set data stores 144 and/or the tenant-specific logic set data stores 146. In other embodiments, a user can make batch edits to logic algorithms in the metadata generation logic set data stores 144 and/or the tenant-specific logic set data stores 146 utilizing the modification module 120 via the API 126. In various embodiments, the edits can include creations, deletions, alterations and the like.

In certain embodiments, a user accessing the modification module 120 via the interface 124 can edit information in the metadata optimization parameters data stores 130, the metadata schema data stores 132, the pre-optimized metadata-generation data stores 134, the metadata descriptor data stores 136 and/or the pre-configured search phrase data stores 138. In other embodiments, a user can make batch edits to information in the metadata optimization parameters data stores 130, the metadata schema data stores 132, the pre-optimized metadata-generation data stores 134, the metadata descriptor data stores 136 and/or the pre-configured search phrase data stores 138 utilizing the modification module 120 via the API 126. In various embodiments, the edits can include creations, deletions, alterations and the like.

In further embodiments, a user accessing the modification module 120 via the interface 124 can edit the functionality of the input module 114, the logic execution module 116, the pattern detection module 118, the metadata determination engine 104, the parsing engine 106, the transformation engine 108, the search phrase generation engine 110 and/or the metadata descriptor generation engine 112. In still further embodiments, a user can make batch edits to the functionality of the input module 114, the logic execution module 116, the pattern detection module 118, the metadata determination engine 104, the parsing engine 106, the transformation engine 108, the search phrase generation engine 110 and/or the metadata descriptor generation engine 112 utilizing the modification module 120 via the API 126. In various embodiments, the edits can include creations, deletions, alterations and the like.

In certain embodiments, the client 150 can include, for example, thin clients, desktop computers, laptop computers, tablet computers, smart phones, wearable or body-borne computers, and the like. In further embodiments, the client 150 can be a plurality of clients on the network 152. In various embodiments, the client 150 can be operable to run an application that can directly connect to the metadata generation optimization system 102 via the interface 124 over the network 152. In various embodiments, the metadata generation optimization system 102 can utilize various interface protocols, for example, transmission control protocol and the internet protocol (TCP/IP), user datagram protocol (UDP) and the like, such that the metadata generation optimization system 102 can send and receive data with all components on the network 152.

Figure 2:
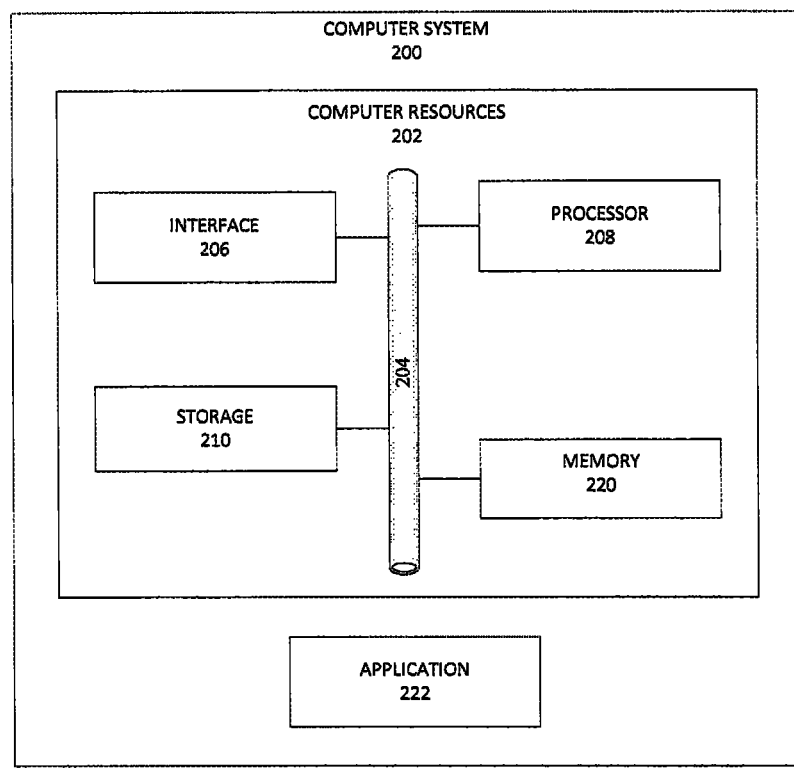
FIG. 2 illustrates an example of a computer system.

FIG. 2 illustrates an example of a computer system 200 that, in some cases, can be representative, for example, the metadata generation optimization system 102. The computer system 200 includes an application 222 operable to execute on computer resources 202. The application 222 can be, for example, an interface for operating the input module 114, the logic execution module 116, the pattern detection module 118 and the modification module 120. In other embodiments, the application 222 can be, for example, an interface for operating and/or accessing the metadata determination engine 104, the parsing engine 106, the transformation engine 108, the search phrase generation engine 110 and the metadata descriptor generation engine 112. In some embodiments, the application 222 can be, for example, an interface for operating and/or accessing the interface 124 and the API 126. In further embodiments, the application 222 can be, for example, an interface for operating and/or accessing the metadata optimization parameters data stores 130, the metadata schema data stores 132, the pre-optimized metadata-generation data stores 134, the metadata descriptor data stores 136, the pre-configured search phrase data stores 138, the metadata optimization parameter logic set data stores 142, the metadata generation logic set data stores 144, the tenant-specific logic set data stores 146, the tenant data stores 148 and the data stores 122. In particular embodiments, the computer system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 200 may comprise any suitable physical form, configuration, number, type and/or layout. As an example, and not by way of limitation, the computer system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 200 may include one or more computer systems; be unitary or distributed; span multiple locations; span multiple machines; or reside in a cloud, which may include one or more cloud components in one or more networks.

In the depicted embodiment, the computer system 200 includes a processor 208, memory 220, storage 210, interface 206, and bus 204. Although a particular computer system is depicted having a particular number of particular components in a particular arrangement, this disclosure contemplates any suitable computer system having any suitable number of any suitable components in any suitable arrangement.

Processor 208 may be a microprocessor, controller, or any other suitable computing device, resource, or combination of hardware, software and/or encoded logic operable to execute, either alone or in conjunction with other components. (e.g., memory 220), the application 222. Such functionality may include providing various features discussed herein. In particular embodiments, processor 208 may include hardware for executing instructions, such as those making up the application 222. As an example and not by way of limitation, to execute instructions, processor 208 may retrieve (or fetch) instructions from an internal register, an internal cache, memory 220, or storage 210; decode and execute them; and then write one or more results to an internal register, an internal cache, memory 220, or storage 210.

In particular embodiments, processor 208 may include one or more internal caches for data, instructions, or addresses. This disclosure contemplates processor 208 including any suitable number of any suitable internal caches, where appropriate. As an example and not by way of limitation, processor 208 may include one or more instruction caches, one or more data caches, and one or more translation lookaside buffers (TLBs). Instructions in the instruction caches may be copies of instructions in memory 220 or storage 210 and the instruction caches may speed up retrieval of those instructions by processor 208. Data in the data caches may be copies of data in memory 220 or storage 210 for instructions executing at processor 208 to operate on; the results of previous instructions executed at processor 208 for access by subsequent instructions executing at processor 208, or for writing to memory 220, or storage 210; or other suitable data. The data caches may speed up read or write operations by processor 208. The TLBs may speed up virtual-address translations for processor 208. In particular embodiments, processor 208 may include one or more internal registers for data, instructions, or addresses. Depending on the embodiment, processor 208 may include any suitable number of any suitable internal registers, where appropriate. Where appropriate, processor 208 may include one or more arithmetic logic units (ALUs); be a multi-core processor, include one or more processors 208; or any other suitable processor.

Memory 220 may be any form of volatile or non-volatile memory including, without limitation, magnetic media, optical media, random access memory (RAM), read-only memory (ROM), flash memory, removable media, or any other suitable local or remote memory component or components. In particular embodiments, memory 220 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 220 may include one or more memories 220, where appropriate. Memory 220 may store any suitable data or information utilized by the computer system 200, including software embedded in a computer readable medium, and/or encoded logic incorporated in hardware or otherwise stored (e.g., firmware). In particular embodiments, memory 220 may include main memory for storing instructions for processor 208 to execute or data for processor 208 to operate on. In particular embodiments, one or more memory management units (MMUs) may reside between processor 208 and memory 220 and facilitate accesses to memory 220 requested by processor 208.

As an example and not by way of limitation, the computer system 200 may load instructions from storage 210 or another source (such as, for example, another computer system) to memory 220. Processor 208 may then load the instructions from memory 220 to an internal register or internal cache. To execute the instructions, processor 208 may retrieve the instructions from the internal register or internal cache and decode them. During or after execution of the instructions, processor 208 may write one or more results (which may be intermediate or final results) to the internal register or internal cache. Processor 208 may then write one or more of those results to memory 220. In particular embodiments, processor 208 may execute only instructions in one or more internal registers or internal caches or in memory 220 (as opposed to storage 210 or elsewhere) and may operate only on data in one or more internal registers or internal caches or in memory 220 (as opposed to storage 210 or elsewhere).

In particular embodiments, storage 210 may include mass storage for data or instructions. As an example and not by way of limitation, storage 210 may include a hard disk drive (HDD), a floppy disk drive, flash memory, an optical disc, a magneto-optical disc, magnetic tape, or a Universal Serial Bus (USB) drive or a combination of two or more of these. Storage 210 may include removable or non-removable (or fixed) media, where appropriate. Storage 210 may be internal or external to the computer system 200, where appropriate. In particular embodiments, storage 210 may be non-volatile, solid-state memory. In particular embodiments, storage 210 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 210 may take any suitable physical form and may comprise any suitable number or type of storage. Storage 210 may include one or more storage control units facilitating communication between processor 208 and storage 210, where appropriate.

In particular embodiments, interface 206 may include hardware, encoded software, or both providing one or more interfaces for communication (such as, for example, packet-based communication) among any networks, any network devices, and/or any other computer systems. As an example and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which computer system 200 is used. As an example and not by way of limitation, computer system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 200 may include any suitable interface 206 for any one or more of these networks, where appropriate.

In some embodiments, interface 206 may include one or more interfaces for one or more I/O devices. One or more of these I/O devices may enable communication between a person and the computer system 200. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 208 to drive one or more of these I/O devices. Interface 206 may include one or more interfaces 206, where appropriate.

Bus 204 may include any combination of hardware, software embedded in a computer readable medium, and/or encoded logic incorporated in hardware or otherwise stored (e.g., firmware) to couple components of the computer system 200 to each other. As an example and not by way of limitation, bus 204 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 204 may include any number, type, and/or configuration of buses 204, where appropriate. In particular embodiments, one or more buses 204 (which may each include an address bus and a data bus) may couple processor 208 to memory 220. Bus 204 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 208 (such as, for example, one or more internal registers or caches), one or more portions of memory 220, one or more portions of storage 210, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more APIs stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
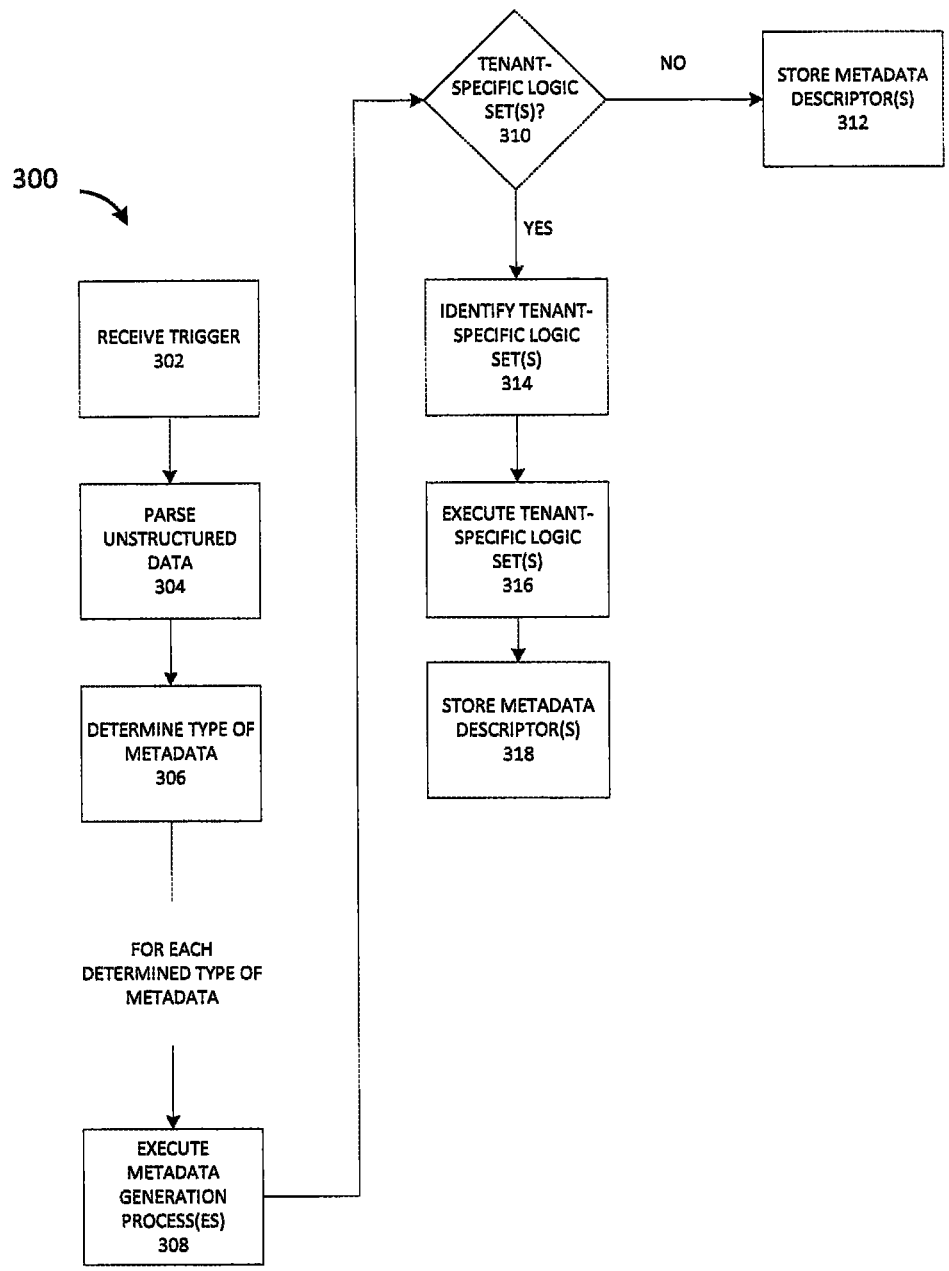
FIG. 3 illustrates an example process for the generation of metadata descriptors.

FIG. 3 illustrates an example process 300 for the generation of metadata descriptors. It should be appreciated that, although the process 300 is described as being performed with respect to the generation of metadata descriptors of a single unstructured data input, in various embodiments, the process 300 can be repeated, or performed in parallel, for each of a multitude of unstructured data input as set forth below. It should further be appreciated that the process 300 can result in various metadata descriptors based on varying determinations with respect to each step as set forth below. In various embodiments, the process 300 can be performed by the metadata determination engine 104, the parsing engine 106, the transformation engine 108, the search phrase generation engine 110, the metadata descriptor generation engine 112 or combinations thereof.

At block 302 a trigger to automatically generate metadata for unstructured data is received. In various embodiments, the trigger can be the receipt of the unstructured data from a user, the identification of the unstructured data via input from the user combinations of same and the like. For example, in certain embodiments, the unstructured data can be received or identified by a user using, for example, the client 150 of the system 100, via the interface 124 leveraging the input module 114. In some embodiments, unstructured data can be uploaded via the API 126 leveraging the input module 114. In other embodiments, the unstructured data can be retrieved by the input module 114 responsive to a trigger and/or automatically at scheduled intervals. In certain embodiments, the unstructured data can be in the form of plain text, rich format text, images, Portable Document Files (PDFs), spreadsheets, SQL database dumps, XML files, ANSI/HL7 files and the like. In some embodiments, received data can be pre-structured, allowing for the bypass of various functionalities in regard to data transformation, cleansing and structuring. In various embodiments, the input module 114 can retrieve data automatically, for example, from the tenant data stores 148. In particular examples, a user can upload unstructured data correlating to medical records, menus, catalogs and the like utilizing the input module 114.

At block 304 the parsing engine 106 parses the unstructured data received utilizing the parsing engine 106. In some embodiments, the parsing engine 106 can perform syntax analysis and/or syntactic analysis by processing and analyzing strings, numbers, symbols and the like in the unstructured data. In certain embodiments, the block 304 can include the parsing engine 106 can extract all or a portion of the text contained in the unstructured data.

At block 306 the metadata determination engine 104 can determine what type of metadata descriptors need to be generated, for example various types of medical codes, by identifying metadata types, such as, for example, medical coding references. In some embodiments, the parsing engine 106 can be leveraged by the metadata determination engine 104 to utilize keyword matching, for example, from a dictionary stored in the data stores 122, to map certain keywords in the unstructured document to various metadata types. In some embodiments, the inputted unstructured data can result in multiple metadata types needed for the generation of metadata descriptors. In some embodiments, if multiple metadata types are identified, the process can branch into parallel processes, recursive-type processing and the like. An example of multiple metadata types will be discussed in fuller details below with respect to FIG. 9.

At block 308 various pre-programmed algorithms and/or functions are executed by various components of the metadata generation optimization system 102 to determine the metadata descriptors for each metadata type determined at the block 306. In some embodiments, at the block 308, the process 300 can utilize the search phrase generation engine 110, the metadata descriptor generation engine 112, the logic execution module 116 and the pattern detection module 118 in various capacities for the execution of the metadata generation. In certain embodiments, at the block 308, the process 300 can utilize data stored in the metadata optimization parameters data stores 130, the metadata schema data stores 132, the pre-optimized metadata-generation data stores 134, the metadata descriptor data stores 136, the pre-configured search phrase data stores 138, the metadata optimization parameter logic set data stores 142 and the metadata generation logic set data stores 146 in various capacities for the execution of the metadata generation. In various embodiments, the final result at the block 308 can be metadata descriptors. In certain embodiments, the metadata descriptors can be single words, alphanumeric codes, strings, sentences and the like. In other embodiments, the metadata descriptors can be expressed in HTML, Keyhole Markup Language (KML), Markdown, Mathematical Markup Language (MathML), TeX, LaTeX, Standard Generalized Markup Language (SGML), XML or other suitable markup language. An example of metadata generation process that can be a sub-process of the process 300 will be described below in fuller detail with respect to FIG. 5.

At decision block 310 the metadata descriptor generation engine 112 determines, based on the unstructured inputted data, whether tenant-specific logic sets need to be applied to the generated metadata descriptors from the block 308. Example types of logic sets/logic algorithms will be described below in fuller detail with respect to FIG. 4. In various embodiments, tenant-specific logic set criteria can be stored as a ruleset within the tenant data stores 148, the data stores 122 or indicated upon the initial import of the unstructured data. In certain embodiments, if it is determined at the decision block 310 that there no tenant-specific logic sets need to be applied, the process 300 proceeds to block 312.

At the block 312 the metadata descriptor generation engine 112 stores the metadata descriptors that were generated at the block 308. Ordinarily, if it is determined at the decision block 310 that tenant-specific logic sets are required, the process proceeds to block 314. At the block 314 the metadata descriptor generation engine 112 identifies what tenant-specific logic sets are required, from the tenant-specific logic set data stores 146, for a particular tenant. In some embodiments, the metadata descriptor generation engine 112 can query tenant-specific rulesets in either the tenant data stores 148 or the data stores 122 to identify which logic sets are required.

At block 316, the metadata descriptor generation engine 112 can leverage the logic execution module 116 to run various pre-programmed algorithms stored within the tenant-specific logic set data stores 146 to modify the metadata descriptors generated at the block 308 as required by the particular tenant. At block 318 the metadata descriptor generation engine 112 stores the tenant-modified metadata descriptors in, for example, the tenant data stores 148.

FIGS. 4A-D illustrates examples of various logic sets that can be implemented by a logic execution module in a system for optimizing automatic schema-based metadata generation. In certain embodiments, the examples of various logic sets that can be implemented by the logic execution module 116 are detailed below. In various embodiments, the logic sets represent pre-programmed sets of computation algorithms that comprise a plurality of computer-executable actions. In some embodiments, the logic sets contained within the metadata optimization parameter logic set data stores 142, the metadata generation logic set data stores 144 and the tenant-specific logic data set data stores 146 can be represented by the following logic algorithm descriptions. The following examples are shown due to their relative simplicity. It should be appreciated that, while the logic algorithms described below can be utilized, this is not an exhaustive list. The illustrations below utilize logic applying to data based on a tree-type structure for traversal. The traversing of a tree can involve iterating over all nodes in some manner. From a given node there is more than one possible next node (e.g., not a linear structure), then, assuming sequential computation (i.e. not parallel), some nodes must be deferred. This is often done via a stack or queue. As a tree is often a self-referential (i.e. recursively defined) structure, traversal can be defined by recursion or, co-recursion, in a very natural and clear fashion. In these cases deferred nodes are stored implicitly in a call stack. In various embodiments, each logic set can be representative of a pre-programmed algorithm that includes a plurality of nodes, such that each node is representative of a computer-executable action towards the execution of that algorithm.

Figure 4A:
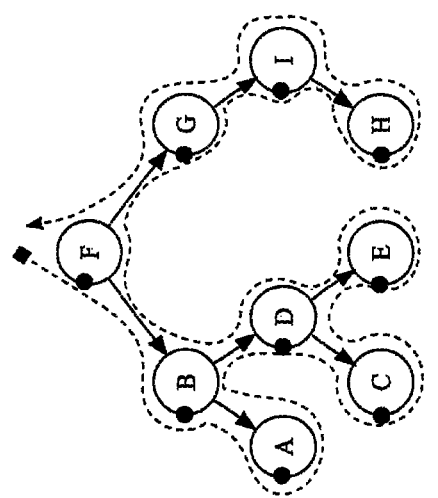
FIGS. 4A-D illustrate examples of various logic sets that can be implemented by a logic execution module in a system for optimizing automatic schema-based metadata generation.

FIG. 4A illustrates an example pre-order tree traversal utilizing a left-to-right traversal. In this example, the tree is traversed in the order of F, B, A, D, C, E, G, I and H, as indicated by a dot on the respective node. Each of the nodes can be representative of a respective computer-executable action, inclusive of events, separate algorithms, executions, binary values and the like. In a typical embodiment, when a given node is reached in the traversal, the corresponding computer-executable action is executed.

Figure 4B:
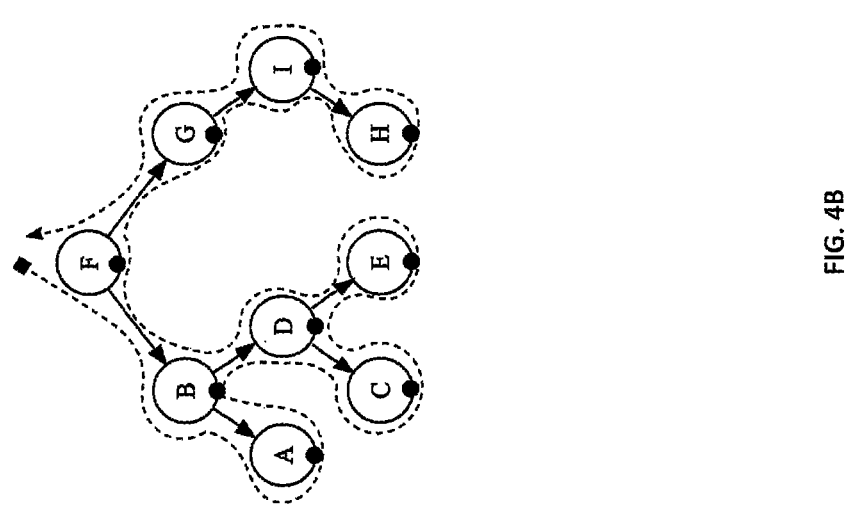

FIG. 4B illustrates an example in-order tree type traversal utilizing a left-to-right traversal. In this example, the tree is traversed in the order of A, B, C, D, E, F, G, H and I, as indicated by a dot on the respective node. Each of the nodes can be representative of a respective computer-executable action, inclusive of events, separate algorithms, executions, binary values and the like. In a typical embodiment, when a given node is reached in the traversal, the corresponding computer-executable action is executed.

Figure 4C:
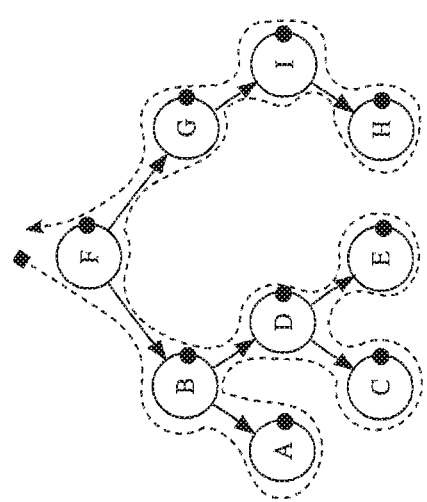

FIG. 4C illustrates and example of a post-order tree utilizing a left-to-right traversal. In this example, the tree is traversed in the order of A, C, E, D, B, H, I, G and F, as indicated by a dot on the respective node. Each of the nodes can be representative of a respective computer-executable action, inclusive of events, separate algorithms, executions, binary values and the like. In a typical embodiment, when a given node is reached in the traversal, the corresponding computer-executable action is executed. Trees can also be traversed in level-order, where every node is traversed on an upper level before going to a lower level. This search is referred to as breadth-first search, as the search tree is broadened as much as possible on each depth before going to the next depth.

Figure 4D:
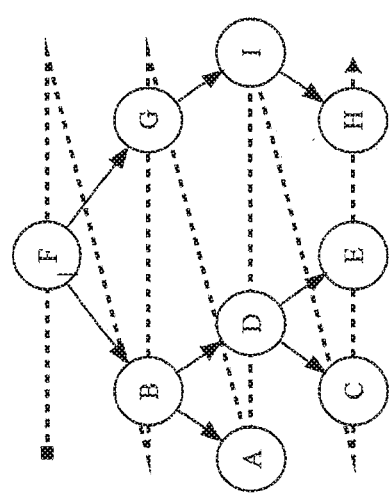

FIG. 4D illustrates an example breadth-first search tree utilizing a left-order traversal. In this example, the tree is traversed in order of F, B, G, A, D, I, C, E and H. Each of the nodes can be representative of a respective computer-executable action, inclusive of events, separate algorithms, executions, binary values and the like. In a typical embodiment, when a given node is reached in the traversal, the corresponding computer-executable action is executed.

The above descriptions, chosen for simplicity, are only a few types of many various types of logic algorithms that can be represented, utilized and/or stored for use by the logic execution module 116. In various embodiments, other logical algorithms can include recursive-type algorithms of a single node, a recursive algorithm and the like. In other embodiments, the logic algorithms can be a stack-algorithm or multi-stack-algorithms including stack- and/or queue-based algorithms, or combinations thereof. In some embodiments, the logic sets can include basic logic gate operators, such as, AND, OR and/or NOT. In other embodiments, the logic sets can include universal logic gate operators, such as, NAND and/or NOR. In various embodiments, the logic sets can include derived logic gate operators, such as, XOR and/or XNOR. In certain embodiments, the logic sets can include a combinations of various logical operators, such as, AND, OR, XOR, NOT, NAND, NOR and/or XNOR. In some embodiments, the logic can be a matching and/or mapping algorithm where known elements are matched and/or mapped with other known elements.

Figure 5:
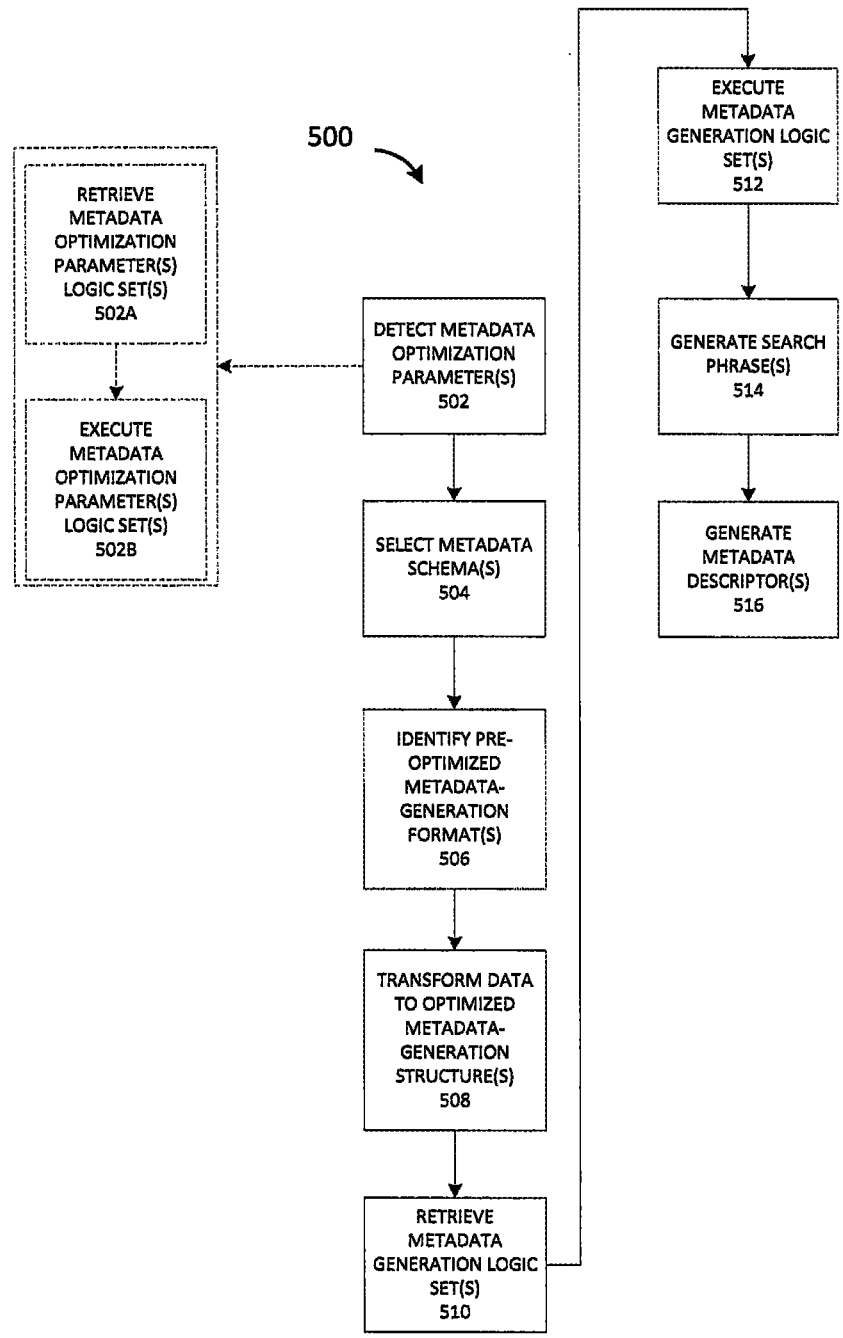
FIG. 5 illustrates an example process for executing metadata generation processes.

FIG. 5 illustrates an example process 500 for executing metadata generation processes. In some embodiments, the process 500 can be performed during the process 300 of FIG. 3 at the block 308. It should be appreciated that, although the process 500 is described as being performed with respect to the generation of metadata descriptors of a single unstructured data input, in various embodiments, the process 500 can be repeated, or performed in parallel, for each of a multitude of unstructured data input as set forth below. It should further be appreciated that the process 500 can result in various metadata descriptors based on varying determinations with respect to each step as set forth below. In various embodiments, the process 500 can be performed by the metadata determination engine 104, the parsing engine 106, the transformation engine 108, the search phrase generation engine 110, the metadata descriptor generation engine 112 or combinations thereof.

At block 502 the metadata determination engine 104 can dynamically detect metadata optimization parameters for the unstructured data. The detection at the block 502 can leverage, for example, the parsed unstructured data from the block 304 of FIG. 3 and the determined metadata types from the block 306 of FIG. 3. In various embodiments, the detection can be considered dynamic in nature because, in certain embodiments, it can be performed automatically in response to the parsing from the block 304 of FIG. 3 and without further user input. In certain embodiments, the detection at block 502 can include performing sub-blocks 502A and 502B.

At the sub-block 502A the metadata determination engine 104 can retrieve metadata optimization parameter logic sets, for example, from the metadata optimization parameter logic set data stores 142, in an effort to identify particular metadata optimization parameters for the inputted unstructured data. For example, the retrieved metadata optimization parameter logic sets can be of any of the types and formats described above with respect to FIGS. 4A-D. and include an arrangement of computer-executable actions. Some of these actions can include, for example, determining the presence or absence of particular combinations of keywords in an applicable optimized metadata-generation structure.

At the sub-block 502B the metadata determination engine 104 can execute the retrieved metadata optimization parameter logic sets. In certain embodiments, the sub-block 502B can include the logic execution module 116 executing, in relation to the parsed unstructured data, the computer-executable actions represented by the retrieved metadata optimization parameter logic sets. In some cases, the execution of the metadata optimization parameters logic sets can yield the metadata optimization parameters. In addition, or alternatively, information yielded by the sub-block 502B can be usable to query, for example, the metadata optimization parameters data store 130 to determine, select and/or identify the metadata optimization parameters. In various embodiments, the metadata optimization parameters can include various types of modalities, for example, medical specialties, foods, diagnoses and/or other relevant identifications of the inputted unstructured data. In some embodiments, increased metadata-generation efficiency can be realized by selecting only a single metadata optimization parameter for the parsed unstructured data.

At block 504 the metadata determination engine 104 automatically selects metadata schemas for the unstructured data, for example, from the metadata schema data stores 132. In some embodiments, the automatic selection by the metadata determination engine 104 can utilize information obtained by the parsing engine 106 at the block 304 of the process 300, while further using the detected metadata optimization parameters identified at the block 502, from the metadata optimization parameters data stores 130, to determine a particular metadata schema, stored in the metadata schema data stores 132, needed in order to generate metadata descriptors for the inputted unstructured data. In some embodiments, any given optimization parameter may correspond to only a single metadata schema. Therefore, in embodiments in which, by design, only a single metadata optimization parameter is detected at the block 502, the automatic selection at the block 504 can involve identifying, from the metadata schema data stores 132, the single metadata schema that is associated with the single metadata optimization parameter. In some embodiments, the metadata schema includes various information, such as codes, prices, address, names, food ingredients and the like, that will be used to generate the metadata descriptors for the unstructured data.

At block 506 the transformation engine 108 identifies pre-optimized metadata-generation formats based on the optimization parameters and/or the metadata schemas resulting from the blocks 502 and 504, respectively. For example, in certain embodiments, the transformation engine 108 identifies the pre-optimized metadata generation formats based, at least in part, on programmed associations between the pre-optimized metadata-generation formats and the selected metadata schemas. For example, in some embodiments, the programmed associations can be realized via queries to the pre-optimized metadata-generation data stores 134. For example, the transformation engine 108 can query the pre-optimized metadata-generation data stores 134, using identifiers for the selected metadata schemas and/or identifiers for the optimization parameters, to identify specific pre-optimized metadata-generation formats corresponding to the detected metadata optimization parameters and the selected metadata schemas. In some embodiments, the pre-optimized metadata-generation formats can include structural information on how the transformation engine 108 should transform the unstructured data to reflect an optimized metadata-generation structure. In various embodiments, the pre-optimized metadata-generation structural information includes data-mapping portions, such that the identified pre-optimized metadata-generation formats can be mapped according to defined rulesets that can be stored in, for example, the data stores 122.

At block 508 the transformation engine 108 utilizes, for example, the mapping instructions identified in the pre-optimized metadata-generation structural information, to transform the unstructured data into an optimized metadata-generation structure of the identified pre-optimized metadata-generation format from block 506. The transformation at block 108 can be configurable for, and specific to, the identified pre-optimized metadata generation format from block 506. In some embodiments, the transformation engine 108 can, according to the identified pre-optimized metadata-generation format, remove unwanted content from the unstructured data that is not required for metadata descriptor generation, as identified by the metadata type, the metadata optimization parameters and the metadata schemas. In some embodiments, the transformation can restructure the arrangement of data in the unstructured format in order to create an optimized data structure. In various embodiments, the transformation engine 108 can include data cleansing processes that include, but are not limited to, removing extra whitespaces, removing new line breaks, identifying sentence fragments, identifying and fixing ambiguities, removing line breaks to form proper sentences and/or removing irrelevant data, as defined by the metadata schema, the metadata optimization parameters and the metadata schemas. In certain embodiments, the final output at the block 508 can serve as the input for further processing functions, and can be stored in, for example, the data stores 122 and/or the tenant data stores 148.

At block 510 the metadata descriptor generation engine 112 can identify, and/or retrieve, metadata generation logic sets, from the metadata generation logic set data stores 144, for the detected metadata optimization parameters. In some embodiments, the metadata descriptor generation engine 112 can utilize the metadata types, the metadata optimization parameters and/or the metadata schemas determined to identify the correct logic sets from the metadata generation logic set data stores 144. In some embodiments, the retrieval and/or identification at the block 510 is based, at least in part, on a programmed association between the retrieved or identified metadata generation logic sets and the detected metadata optimization parameters. For example, in some embodiments, the programmed association can be realized via one or more queries to the metadata generation logic set data stores 144. For example, the metadata descriptor generation engine 112 can query the metadata generation logic set data stores 144, using identifiers for the determined metadata types, the detected metadata optimization parameters and/or the selected metadata schemas, to identify and retrieve the metadata generation logic sets.

At block 512 the metadata descriptor generation engine 112 can execute the metadata generation logic sets resulting from the block 510 in relation to the optimized metadata-generation structure from the block 508. For example, the metadata descriptor generation engine 112 can leverage the logic execution module 116 to execute computer-executable actions represented by each of the metadata generation logic sets on the optimized metadata-generation structure, while following any applicable traversal or recursive pattern. In various embodiments, each of the metadata generation logic sets can be a pre-programmed implementation of an algorithm, such that each computer-executable action represented therein embodies one or more steps or phases of the algorithm. In certain embodiments, the execution at the block 512 can return values or tokens.

At block 514 the search phrase generation engine 110 generates search phrases responsive to the execution of the logic sets from the block 512. In various embodiments, the search phrase generation engine 110 can generate single words, alphanumeric codes, search strings, sentences and the like. In some embodiments, the search phrase generation engine 110 can generate simple and/or special characters or codes. In various embodiments, the generated search phrases can be utilized to generate metadata descriptors corresponding to the unstructured data. For example, in some embodiments, the generation at the block 514 can include concatenating the values or tokens returned by the block 512, if any, into the search phrase.

At block 516 the process 500 can generate metadata descriptors based on the search phrases generated by the search phrase generation engine 110. The generation of the metadata descriptors will be described in fuller detail below with regard to FIGS. 6 and 7.

Figure 6:
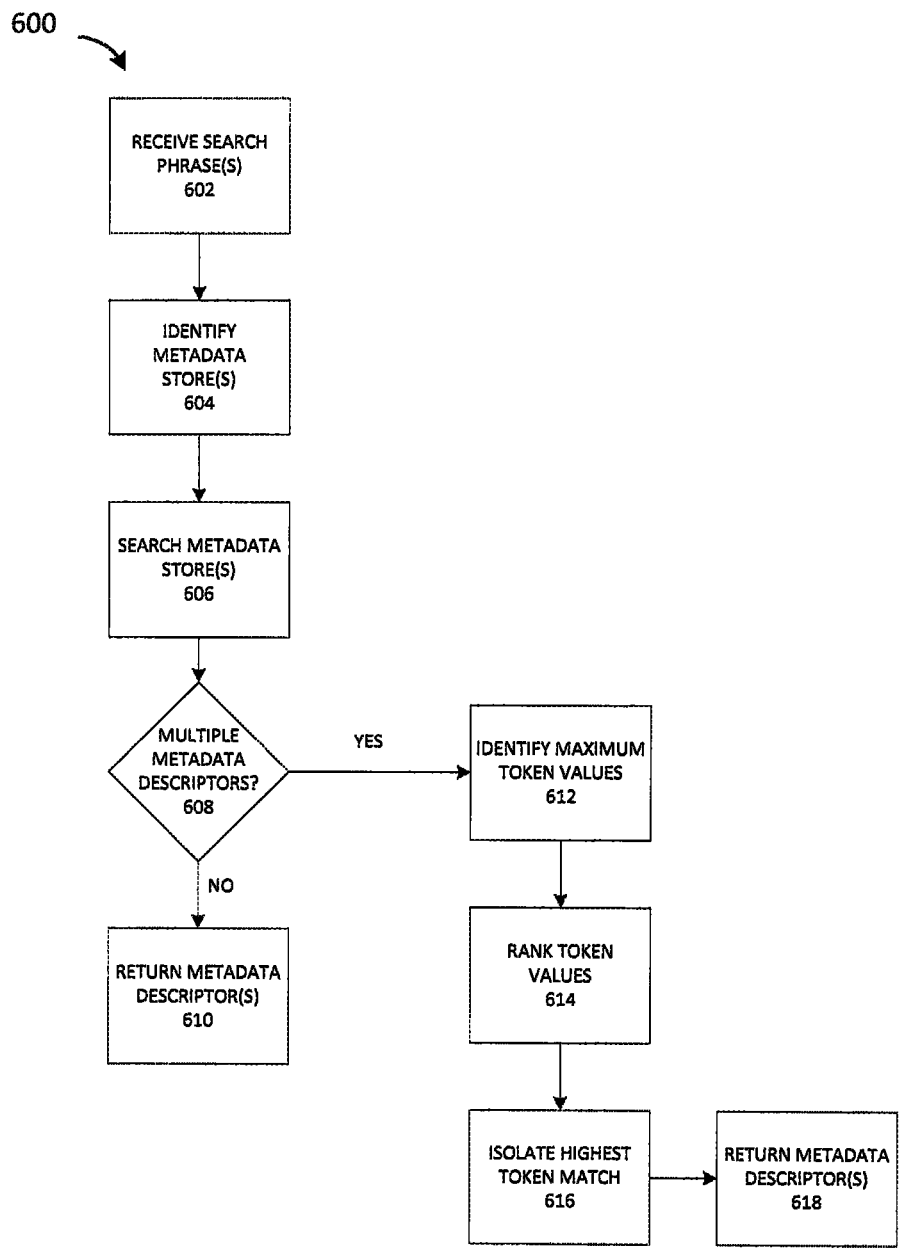
FIG. 6 illustrates an example process that utilizes a search phrase to generate metadata descriptors by searching known data stores.

FIG. 6 illustrates an example process 600 that utilizes a search phrase to generate metadata descriptors by searching known data stores. In some embodiments, the process 600 can be performed during the process 500 of FIG. 5 at the block 516. It should be appreciated that, although the process 600 is described as being performed with respect to the generation of metadata descriptors of a single search phrase input, in various embodiments, the process 600 can be repeated, or performed in parallel, for each of a multitude of search phrase inputs as set forth below. It should further be appreciated that the process 600 can result in various metadata descriptors based on varying determinations with respect to each step as set forth below. In various embodiments, the process 600 can be performed by the metadata determination engine 104, the parsing engine 106, the transformation engine 108, the search phrase generation engine 110, the metadata descriptor generation engine 112 or combinations thereof.

At block 602 a search phrase is received by the metadata descriptor generation engine 112. In some embodiments, the search phrase can be the search phrase generated at the block 514 of the process 500. In other embodiments, the search phrase can be manually inputted and thus be entirely dissociated from the process 500. At block 604 the metadata descriptor generation engine 112 identifies, based on the search phrase, which metadata descriptor data store to search. In some embodiments, the metadata descriptor data store is the metadata descriptor data stores 136. In various embodiments, the metadata descriptor data stores 136 can be multiple data stores relating to different metadata descriptor information. In certain embodiments, the metadata descriptor data stores 136 can contain sub-data stores pertaining to different metadata descriptors. In further embodiments, the metadata descriptor data stores 136 can include hierarchical data stores. In certain embodiments, after the correct metadata descriptor data store is identified the process proceeds to block 606. At the block 606 the generated search phrase is queried in, for example, the metadata descriptor data stores 136 and results in metadata descriptors for the search phrase.

At decision block 608 the metadata descriptor generation engine 112 identifies whether or not multiple metadata descriptors have been provided. In some embodiments, multiple metadata descriptors are desired. In other embodiments single metadata descriptors are desired. In still further embodiments, multiple metadata descriptors are desired, but only a certain number of the multiple metadata descriptors are desired. In certain embodiments, when either a single metadata descriptor or multiple metadata descriptors are provided, and desired, the process proceeds to block 610. At the block 610 the metadata descriptors are returned.

At the decision block 608 if multiple metadata descriptors are not desired the process 600 proceeds to block 612. At the block 612 the metadata descriptor generation engine 112 identifies a maximum token value for each returned result. In some embodiments, the maximum token value can be a summation of the frequency in which a particular metadata descriptor was returned. In other embodiments, the maximum token value can be based upon a priority that can be referenced in, for example, a ruleset within the data stores 122 and/or the tenant data stores 148. At block 614 the metadata descriptor generation engine 112 ranks the token values for each returned result from the block 612. In some embodiments, the ranking can be based on a summation of token values. In other embodiments, the ranking can be based on the ruleset stored within the data stores 122 and/or the tenant data stores 148. In certain embodiments, after the metadata descriptors have each been ranked, the process proceeds to block 616. At the block 616 the metadata descriptor generation engine 112 isolates the highest token match according to either of the preceding methods in relation to the maximum token value determination or the ranking of the token values at the blocks 612 and 614, respectively. At block 618 the metadata descriptors isolated at the block 616 are returned.

Figure 7:
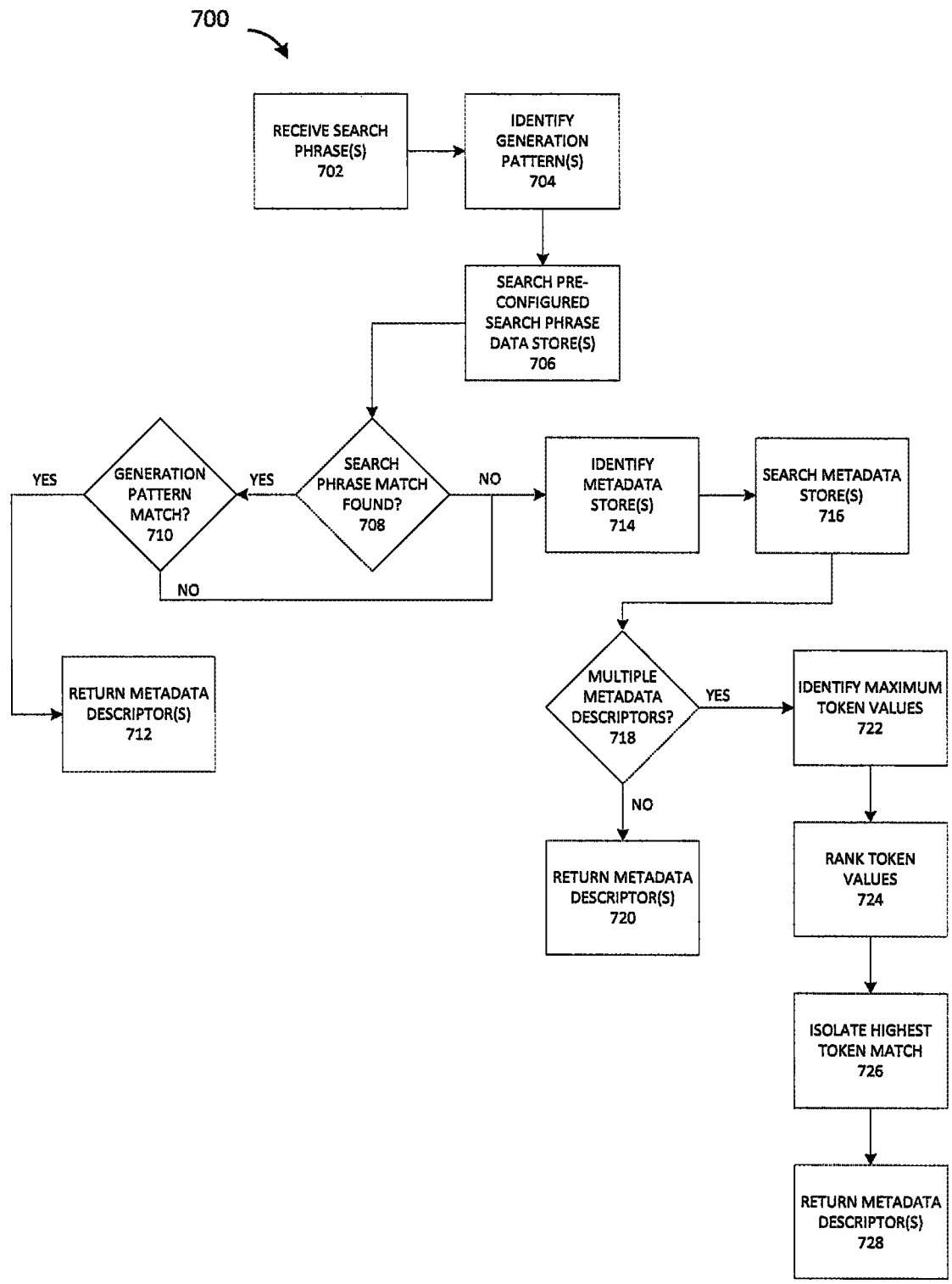
FIG. 7 illustrates an example process that utilizes a search phrase to generate metadata descriptors by verifying the search phrase to pre-configured search phrases.

FIG. 7 illustrates an example process 700 that utilizes a search phrase to generate metadata descriptors by verifying the search phrase to pre-configured search phrases. In some embodiments, the process 700 can be performed during the process 500 of FIG. 5 at the block 516. It should be appreciated that, although the process 600 is described as being performed with respect to the generation of metadata descriptors of a single search phrase input, in various embodiments, the process 600 can be repeated, or performed in parallel, for each of a multitude of search phrase inputs in conjunction with pre-configured search phrases as set forth below. It should further be appreciated that the process 700 can result in various metadata descriptors based on varying determinations with respect to each step as set forth below. In various embodiments, the process 700 can be performed by the metadata determination engine 104, the parsing engine 106, the transformation engine 108, the search phrase generation engine 110, the metadata descriptor generation engine 112 or combinations thereof.

At block 702 a search phrase is received by the pattern detection module 118. In some embodiments, the search phrase can be the search phrase generated at the block 514 of the process 500. In other embodiments, the search phrase can be manually inputted and thus be entirely dissociated from the process 500.

At block 704 the pattern detection module 118 identifies patterns used to generate the received search phrase. In some embodiments, the pattern detection module 118 automatically analyzes the logic sets used to generate the received search phrase. In other embodiments, the pattern detection module 118 can review a tag associated with the received search phrase in order to identify the pattern of logic used to generate the received search phrase. In some embodiments, the pattern detection module 118 can do a one-to-one match, determining that only the phrases themselves need to match.

At block 706 the metadata descriptor generation engine 112 searches a pre-configured search phrase data stores, for example, the pre-configured search phrase data stores 138, looking for a pre-configured search phrase that matches the received search phrase. At decision block 708 if a match is found within the pre-configured search phrase data stores 138 the process proceeds to decision block 710. If no match is found at the decision block 708, the process proceeds to block 714. At the decision block 710 the pattern detection module 118 reviews each received pre-configured search phrase to identify a pattern. In some embodiments, the pattern detection module 118 automatically analyzes the logic sets used to generate the pre-configured search phrase. In other embodiments, the pattern detection module 118 can review a tags associated with the pre-configured search phrase and/or the received search phrase in order to identify the pattern of logic used to generate the pre-configured search phrase and/or the received search phrase. In certain embodiments, the pattern detection module 118 reviews the pre-configured search phrase generation pattern against the received search phrase generation pattern. For example, if the pre-configured search phrase and the received search phrase only have to match in phrase alone (i.e. a one-to-one match), the pattern detection module 118 would identify this as a match. In another example, if the pre-configured search phrase has a pattern "X" and the received search phrase has a pattern "Y", and the received pattern requires more than a one-to-one match, the pattern detection module 118 would identify this as a mismatch. If at the decision block 710 it is determined that the patterns of the pre-configured search phrase and the received search phrase match, the process continues to block 712. If at the decision block 710 it is determined that the patterns do not match, the process proceeds to the block 714.

At the block 712 the metadata descriptor generation engine 112 queries the pre-configured search phrase data stores 138 to retrieve all relevant data related to the pre-configured search phrase. In some embodiments, this can include receiving the metadata descriptors correlating to the pre-configured search phrase. In certain embodiments, the process 700 allows for an audit and/or verification of generated search phrases against pre-configured search phrases. For example, if a particular search phrase generated with a particular set of logic returns incorrect metadata descriptors, a user can add a pre-configured search phrase to return the correct metadata descriptors whenever the search phrase generated with the particular set of logic is received. Continuing the example, if search phrase "X" always generates metadata descriptors "YY", but needs to generate "YZ", a user can create a pre-configured search phrase for "X" such that when search phrase "X" is returned, the metadata descriptors "YZ" will be returned instead of the incorrect "YY" metadata descriptors. In various embodiments, after the metadata descriptors are returned for the pre-configured search phrase, the metadata descriptors are correlated to the returned search phrase.

At the block 714 the metadata descriptor generation engine 112 identifies, based on the search phrase, which metadata descriptor data store to search. In some embodiments, the metadata descriptor data store is the metadata descriptor data stores 136. In various embodiments, the metadata descriptor data stores 136 can be multiple data stores relating to different metadata descriptor information. In certain embodiments, the metadata descriptor data stores 136 can contain sub-data stores pertaining to different metadata descriptors. In further embodiments, the metadata descriptor data stores 136 can include hierarchical data stores. In certain embodiments, after the correct metadata descriptor data store is identified the process proceeds to block 716. At the block 716 the generated search phrase is queried in, for example, the metadata descriptor data stores 136 and results in metadata descriptors for the search phrase.

At decision block 718 the metadata descriptor generation engine 112 identifies whether or not multiple metadata descriptors have been provided. In some embodiments, multiple metadata descriptors are desired. In other embodiments single metadata descriptors are desired. In still further embodiments, multiple metadata descriptors are desired, but only a certain number of the multiple metadata descriptors are desired. In certain embodiments, when either a single metadata descriptor or multiple metadata descriptors are provided, and desired, the process 700 proceeds to block 720. At the block 720 the metadata descriptors are returned.

At the decision block 718 if multiple metadata descriptors are not desired the process 700 proceeds to block 722. At the block 722 the metadata descriptor generation engine 112 identifies a maximum token value for each returned result. In some embodiments, the maximum token value can be a summation of the frequency in which a particular metadata descriptor was returned. In other embodiments, the maximum token value can be based upon a priority that can be referenced in, for example, a ruleset within the data stores 122 and/or the tenant data stores 148. At block 724 the metadata descriptor generation engine 112 ranks the token values for each returned result from the block 612. In some embodiments, the ranking can be based on a summation of token values. In other embodiments, the ranking can be based on the ruleset stored within the data stores 122 and/or the tenant data stores 148. In certain embodiments, after the metadata descriptors have each been ranked, the process proceeds to block 726. At the block 726 the metadata descriptor generation engine 112 isolates the highest token match according to either of the preceding methods in relation to the maximum token value determination or the ranking of the token values at the blocks 722 and 724, respectively. At block 728 the metadata descriptors isolated at the block 726 are returned.

Figure 8:
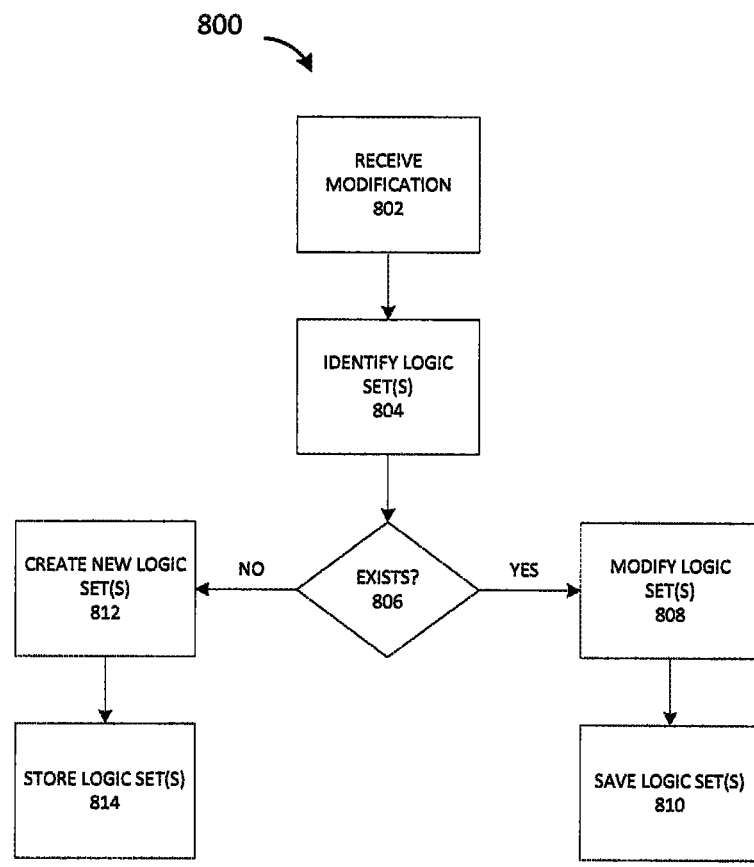
FIG. 8 illustrates an example process to update, delete, create or otherwise modify logic sets within a system for optimizing automatic schema-based metadata generation.

FIG. 8 illustrates an example process 800 to update, delete, create or otherwise modify logic sets within a system for optimizing automatic schema-based metadata generation. It should be appreciated that, although the process 800 is described as being performed with respect to the modification of a single logic set, in various embodiments, the process 800 can be repeated, or performed in parallel, for each of a multitude of modifications as set forth below. In various embodiments, the process 800 can be performed by the metadata determination engine 104, the parsing engine 106, the transformation engine 108, the search phrase generation engine 110, the metadata descriptor generation engine 112 or combinations thereof. While the process 800 is generally described as modifying a logic set, in various embodiments, the process 800 can be utilized to update the metadata optimization parameter and/or the metadata schema.

At block 802 the modification module 120 receives a modification to a particular logic set. In some embodiments, this can include updating, deleting, creating and the like. At block 804 the modification module 120 identifies what set of logic the modification corresponds to. In some embodiments, the modification module 120 reviews the contents of the metadata optimization parameter logic set data stores 142, the metadata generation logic set data stores 144 and/or the tenant-specific logic set data stores 146 to identify what logic set is being modified or whether the logic set exists currently within the logic data stores 140. At decision block 806 the modification module 120 determines if a logic set exists for the received modification. If the logic set currently exists the process proceeds to block 808. If the logic set does not currently exist the process proceeds to block 812.

At the block 808 the modification module 120 can make the modifications to the corresponding identified logic set. In some embodiments, this could include changing various logical operators, as described above with respect to FIG. 4. At block 810 once the modifications are complete, the modification module 120 saves the changes to the respective data stores. At the block 812 the modification module 120 can create a new logic set. In certain embodiments, the modification module 120 can identify which type of logic set is being created, for example, a tenant-specific logic set. At block 814 the modification module 120 can store the new logic set in the appropriate data stores. For example, if it is determined during the creation of the logic set at the block 812 that the logic set is a tenant-specific logic set, at the block 814 the modification module 120 can store the new tenant-specific logic set in the tenant-specific logic set data stores 146.

Figure 9:
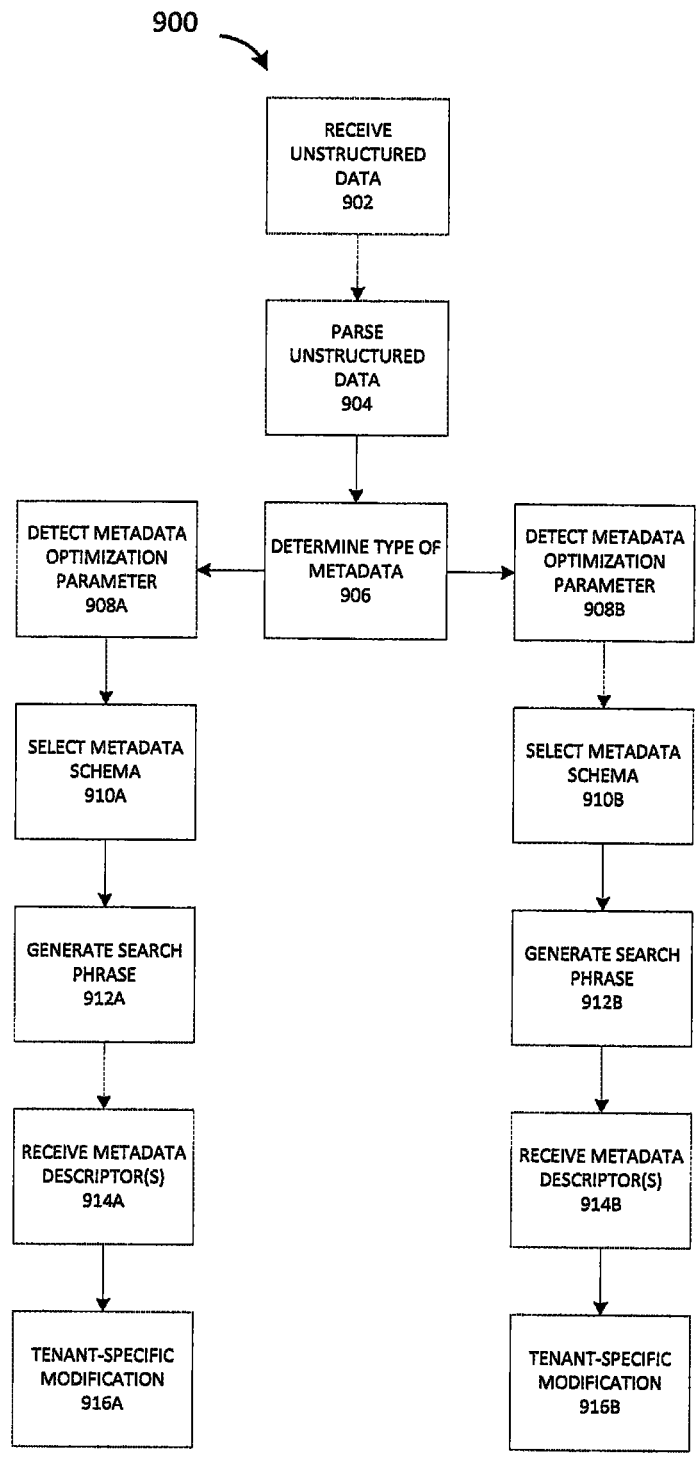
FIG. 9 illustrates an example process for the generation of metadata descriptors as related to medical coding.

FIG. 9 illustrates an example process 900 for the generation of metadata descriptors as related to medical coding. It should be appreciated that, although the process 900 is described as being performed with respect to a single unstructured dataset resulting in two sets of metadata descriptors, in various embodiments, the process 900 can be repeated, or performed in parallel, for each of a multitude of unstructured datasets and can result in further metadata descriptors for each unstructured dataset as set forth below. In various embodiments, the process 900 can be performed by the metadata determination engine 104, the parsing engine 106, the transformation engine 108, the search phrase generation engine 110, the metadata descriptor generation engine 112 or combinations thereof.

At block 902 an unstructured medical record can be received from a user, using, for example, the client 150 of the system 100, via the interface 124 leveraging the input module 114. In certain embodiments, the unstructured medical record can be in the form of plain text, rich format text, images. PDFs, spreadsheets. SQL database dumps, XML files, ANSI/HL7 files and the like. In some embodiments, the input module 114 can retrieve the unstructured medical record automatically, for example, from the tenant data stores 148. In some embodiments, the unstructured medical record can be uploaded via the API 126. At block 904 the parsing engine 106 parses the unstructured medical record, received at the block 902, utilizing the parsing engine 106. In some embodiments, the parsing engine 106 can perform syntax analysis and/or syntactic analysis by processing and analyzing strings, numbers, symbols and the like in the unstructured medical record.

At the block 906 the metadata determination engine 104 determines what type of metadata descriptors need to be generated and identifies specific types of metadata. At the block 906 the metadata determination engine 104 can determine the metadata type to be both Current Procedural Terminology (CPT) codes and $10^{th}$ Revision International Statistical Classification of Diseases and Related Health Problems (ICD10) codes. At the block 906 the process diverges into two parallel processes, one for the CPT codes and one for the ICD10 codes. For simplicity and as the overall process remains the same, the CPT coding process blocks will have the suffix "A" and the ICD10 coding process blocks will have the suffix "B".

At blocks 908A and 908B the metadata determination engine 104 can detect the metadata optimization parameters for the unstructured medical record. In some embodiments, the metadata determination engine 104 can retrieve metadata optimization parameter logic sets from the metadata optimization parameter logic set data stores 142 to be used to identify particular metadata optimization parameters for the received unstructured medical record. Functionality at the blocks 908A and 908B operate in a similar fashion to that of the blocks 502, 502A and 502B of the process 500 of FIG. 5. In this particular example, the metadata determination engine 104 determines a medical specialty at the block 908A and a diagnosis at the block 908B.

At blocks 910A and 910B the metadata determination engine 104 selects metadata schemas corresponding to the determined metadata type. In some embodiments, the metadata determination engine 104 selects metadata schemas residing in the metadata schema data stores 132. In certain embodiments, the metadata determination engine 104 can utilize information obtained by the parsing engine 106 at the block 904 to determine a particular data schema needed in order to generate metadata descriptors, while further utilizing the metadata optimization parameters identified at the block 906. In this particular example, the metadata determination engine 104 determines that the CPT codes will be utilized as the standard reference (i.e. schema) at the block 910A and that the ICD10 codes will be utilized as the standard reference (i.e. schema) at the block 910B.

At blocks 912A and 912B the search phrase generation engine 110 generates search phrases responsive to logic sets being executed according to the functionality described at the blocks 510, 512 and 514 of the process 500 of FIG. 5. In this particular example, the search phrase generation engine 110 can generate a search phrase of "COMPUTED TOMOGRAPHY HEAD OR BRAIN WITHOUT CONTRAST MATERIAL" at the block 912A, for example if the specialty identified at the block 908A was radiology. Similarly, in this particular example, the search phrase generation engine 110 can generate a search phrase of "CEREBRAL ISCHEMIA" at the block 912B, for example if the diagnosis identified at the block 908B was related to diseases of the circulatory system.

At blocks 914A and 914B the metadata descriptor generation engine 112 generates metadata descriptors for each search phrase generated at the blocks 912A and 912B. Functionality at the blocks 914A and 914B operate in a similar fashion to that of either of the processes 600 of FIG. 6 or 700 of FIG. 7. In this particular example, using the search phrases generated at the blocks 912A and 912B and utilizing one of the processes 600 or 700, the metadata descriptor generation engine 112 could retrieve "70450" for the CPT code at the block 914A and "167.82" for the ICD10 code at the block 914B.

At blocks 916A and 916B the metadata descriptor generation engine 112 modifies the metadata descriptor in a similar fashion to that of the decision block 310 of FIG. 3 and, subsequently, the blocks 312, 314, 316 and 318 of the process 300. In this particular example, the modification can include changing the codes, supplementing the codes, adding additional tenant-specific modifiers to the codes and the like, to each of the codes retrieved at the blocks 914A and 914B.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may" "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method of optimizing automatic schema-based metadata generation, the method comprising:
   receiving a trigger to automatically generate metadata for unstructured data;
   parsing the unstructured data responsive to the trigger;
   responsive to the parsing dynamically detecting a metadata optimization parameter for the unstructured data based, at least in part, on a matching of words in the parsed unstructured data to a stored dictionary, wherein the metadata optimization parameter is included among a plurality of pre-specified metadata optimization parameters in a data store;
   automatically selecting a metadata schema for the unstructured data based, at least in part, on the metadata optimization parameter;
   identifying a pre-optimized metadata-generation format for the selected metadata schema based, at least in part, on a programmed association between the pre-optimized metadata-generation format and the selected metadata schema;
   automatically transforming the unstructured data into an optimized metadata-generation structure of the pre-optimized metadata-generation format;
   identifying a metadata-generation logic set, from among a plurality of stored pre-programmed metadata generation logic sets, for the detected metadata optimization parameter, wherein the identification is based, at least in part, on a programmed association between the metadata-generation logic set and the detected metadata optimization parameter, and wherein the stored pre-programmed logic set comprises a plurality of computer-executable actions;
   executing the plurality of computer-executable actions in relation to the optimized metadata-generation structure, wherein the executing returns at least selected values from the optimized metadata-generation structure;
   generating a search phrase using the at least selected values responsive to the execution of the plurality of computer-executable actions;
   generating a metadata descriptor based, at least in part, on the search phrase; and
   storing the metadata descriptor in relation to the unstructured data.

2. The method of claim 1, the generating the metadata descriptor comprising:
   automatically identifying a metadata store associated with the selected metadata schema;
   searching the metadata store using the search phrase; and
   returning the metadata descriptor responsive to the searching.

3. The method of claim 1, the generating the metadata descriptor comprising:
   automatically identifying a metadata store associated with the selected metadata schema;
   searching the metadata store using the search phrase;
   receiving a plurality of metadata descriptors responsive to the searching;
   identifying a maximum token match for each of the plurality of metadata descriptors;
   automatically selecting the metadata descriptor, wherein the metadata descriptor is selected responsive to having a highest token match of each of the plurality of metadata descriptors; and
   returning the metadata descriptor responsive to the selecting.

4. The method of claim 1, the generating the metadata descriptor comprising:
   identifying a pattern comprising information interrelated to the search phrase;
   verifying the search phrase against a plurality of pre-configured search phrases with matching patterns;
   identifying at least one pre-configured search phrase based, at least in part, on the pattern; and
   returning the metadata descriptor responsive to the identifying.

5. The method of claim 4, wherein the patterns are based on at least one of computational patterns relating to the metadata optimization parameter and the metadata-generation logic set.

6. The method of claim 1, comprising:
   identifying a tenant associated with the unstructured data;
   identifying a tenant-specific logic set for the tenant, wherein the identification is based, at least in part, on a programmed association between the tenant-specific logic set and the tenant, and wherein the tenant-specific logic set comprises a plurality of tenant-specific computer-executable actions;
   executing the tenant-specific logic set in relation to the metadata descriptor; and
   responsive to the executing, modifying the metadata descriptor using a result of the executing.

7. The method of claim 1, wherein the plurality of computer-executable actions are expressed in a tree abstract data type, the executing comprising a traversal of the tree abstract data type.

8. The method of claim 1, wherein the computer-executable actions are expressed as input/out nodes on a graph, the executing comprising a traversal of the input/output nodes on the graph.

9. The method of claim 1, wherein the computer-executable actions are represented as recursive expressions.

10. The method of claim 1, the dynamically detecting the metadata optimization parameter comprising:

identifying a metadata optimization parameter logic set, from among a plurality of stored pre-programmed metadata optimization parameter logic sets; and executing a plurality of metadata optimization parameter computer-executable actions in relation to the parsing of the unstructured data.

11. The method of claim 10, wherein the plurality of metadata optimization parameter computer-executable actions are expressed in a tree abstract data type, the executing comprising a traversal of the tree abstract data type.

12. The method of claim 10, wherein the plurality of metadata optimization parameter computer-executable actions are expressed as input/out nodes on a graph, the executing comprising a traversal of the input/output nodes on the graph.

13. The method of claim 10, wherein the plurality of metadata optimization parameter computer-executable actions are represented as recursive expressions.

14. The method of claim 1, comprising:
receiving a modification to the metadata optimization parameter; and
modifying the metadata optimization parameter to reflect the received modification.

15. The method of claim 1, comprising:
receiving a modification to the metadata schema; and
modifying the metadata schema to reflect the received modification.

16. The method of claim 1, comprising:
receiving a modification to the metadata-generation logic; and
modifying the metadata-generation logic to reflect the received modification.

17. The method of claim 1, wherein the metadata descriptor comprises a markup language of the unstructured data.

18. The method of claim 1, wherein the metadata descriptor comprises unique identifiers relating to the unstructured data.

19. A system comprising a processor coupled to a memory, wherein the processor is operable to implement a method comprising:
receiving a trigger to automatically generate metadata for unstructured data;
parsing the unstructured data responsive to the trigger;
responsive to the parsing dynamically detecting a metadata optimization parameter for the unstructured data based, at least in part, on a matching of words in the parsed unstructured data to a stored dictionary, wherein the metadata optimization parameter is included among a plurality of pre-specified metadata optimization parameters in a data store;
automatically selecting a metadata schema for the unstructured data based, at least in part, on the metadata optimization parameter;
identifying a pre-optimized metadata-generation format for the selected metadata schema based, at least in part, on a programmed association between the pre-optimized metadata-generation format and the selected metadata schema;
automatically transforming the unstructured data into an optimized metadata-generation structure of the pre-optimized metadata-generation format;
identifying a metadata-generation logic set, from among a plurality of stored pre-programmed metadata generation logic sets, for the detected metadata optimization parameter, wherein the identification is based, at least in part, on a programmed association between the metadata-generation logic set and the detected metadata optimization parameter, and wherein the stored pre-programmed logic set comprises a plurality of computer-executable actions;
executing the plurality of computer-executable actions in relation to the optimized metadata-generation structure, wherein the executing returns at least selected values from the optimized metadata-generation structure;
generating a search phrase using the at least selected values responsive to the execution of the plurality of computer-executable actions;
generating a metadata descriptor based, at least in part, on the search phrase; and
storing the metadata descriptor in relation to the unstructured data.

20. A computer-program product comprising a non-transitory computer-usable medium having computer-readable program code embodied therein, the computer-readable program code adapted to be executed to implement a method comprising:
receiving a trigger to automatically generate metadata for unstructured data;
parsing the unstructured data responsive to the trigger;
responsive to the parsing dynamically detecting a metadata optimization parameter for the unstructured data based, at least in part, on a matching of words in the parsed unstructured data to a stored dictionary, wherein the metadata optimization parameter is included among a plurality of pre-specified metadata optimization parameters in a data store;
automatically selecting a metadata schema for the unstructured data based, at least in part, on the metadata optimization parameter;
identifying a pre-optimized metadata-generation format for the selected metadata schema based, at least in part, on a programmed association between the pre-optimized metadata-generation format and the selected metadata schema;
automatically transforming the unstructured data into an optimized metadata-generation structure of the pre-optimized metadata-generation format;
identifying a metadata-generation logic set, from among a plurality of stored pre-programmed metadata generation logic sets, for the detected metadata optimization parameter, wherein the identification is based, at least in part, on a programmed association between the metadata-generation logic set and the detected metadata optimization parameter, and wherein the stored pre-programmed logic set comprises a plurality of computer-executable actions;
executing the plurality of computer-executable actions in relation to the optimized metadata-generation structure, wherein the executing returns at least selected values from the optimized metadata-generation structure;
generating a search phrase using the at least selected values responsive to the execution of the plurality of computer-executable actions;
generating a metadata descriptor based, at least in part, on the search phrase; and
storing the metadata descriptor in relation to the unstructured data.

* * * * *